3,575,958
PREPARATION OF NUCLEOSIDE-5′-PHOSPHORAMIDATES
Noriko Nagasawa, Tokyo, Masaharu Yoshikawa, Kawasaki-shi, and Tetsuya Kato, Fujisawa-shi, Japan, assignors to Ajinomoto Co., Inc., Tokyo, Japan
No Drawing. Filed Apr. 16, 1968, Ser. No. 721,566
Claims priority, application Japan, Apr. 25, 1967, 42/26,446
Int. Cl. C07d 51/32, 51/54
U.S. Cl. 260—211.5                                          6 Claims

ABSTRACT OF THE DISCLOSURE

Nucleosides or 2′,3′-O-protected nucleosides are readily converted to the corresponding dichlorophosphates by reaction with phosphorus oxychloride. The dichlorophosphates, when partly hydrolyzed to the monochlorophosphates, can be reacted with ammonia or amines at high yields to the ammonium or amine salts of the 5′-phosphoramidates in a solvent medium essentially consisting of trialkyl phosphates or tri-haloalkyl phosphates.

---

This invention relates to the preparation of nucleoside-5′-phosphoramidates and the corresponding 2′,3′-O-protected derivatives thereof.

The nucleoside-5′-phosphoramidates and their 2′,3′-O-protected derivatives are useful intermediates in the synthesis of nucleoside-5′-diphosphates and -triphosphates which have found applications in medicine and as reagents in biological chemistry.

The nucleoside-5′-phosphoramidates or their 2′,3′-O-protected derivatives were prepared heretofore by reacting a 2′,3′-O-protected nucleoside with dichlorophosphoromorpholidate (Japanese published patent application No. 17848/1964) or with $p^1$-diphenyl-$p^2$-chlorophosphoromorpholidate in the presence of a proton acceptor (Japanese published patent application No. 11,622/1925); by condensing a nucleotide with morpholine in the presence of dicyclohexylcarbodiimide (R. W. Chambers et al. J.A.C.S. 80 (1958), 3752–3756); or by reacting a 2′,3′-di-O-acetyl nucleoside-5′-phenyl phosphorochloridate with ammonia (ibid., 3749–3752).

The known methods are uneconomical because of poor yields, expensive reagents, or complex procedures. They are not suitable for the preparation of nucleoside-5′-phosphoramidates on an industrial scale.

It has now been found that the nucleoside-5′-monochlorophosphates (and the corresponding 2′,3′-O-protected derivatives which will be understood hereinafter to be encompassed by the term "nucleoside") can be converted to the corresponding phosphoramidates in very high yields if they are reacted with ammonia or an amine in a liquid medium essentially consisting of trialkyl phosphates or tri-haloalkyl phosphates.

The nucleoside-5′-monochlorophosphates are readily prepared from the dichlorophosphate by hydrolysis with controlled amounts of water, and the dichlorophosphates are prepared from the nucleosides by means of phosphorus oxychloride or tetrachloropyrophosphates in a known manner.

The nucleosides whose monochlorophosphates are capable of reacting with ammonia and amines in the manner outlined above include all naturally occurring purine-based and pyrimidine-based nucleosides and all closely analogous compounds not occurring in nature which we have been able to test. We have prepared nucleoside-5′-phosphoramidates, for example, from the dichlorophosphates of adenosine, inosine, guanosine, uridine, thymidine, 5-amino-4-imidazole-carboxamide riboside, and from their 2′,3′-O-protected derivatives. The yield based on the nucleoside-5′-dichlorophosphate may exceed 90%.

The nucleoside dichlorophosphates may be prepared from the nucleosides and a selected phosphorylation agent with or without a solvent. If the dichlorophosphate is soluble in the reaction mixture, it can be precipitated by adding ether, petroleum ether, benzene, or a halogenated hydrocarbon solvent in which the nucleoside dichlorophosphates are insoluble.

When contacted with an equimolecular amount of water, the dichlorophosphate is converted to the monochlorophosphate which need not be isolated for the subsequent reaction with ammonia or an amine. The acid produced by hydrolysis, however, must be considered in selecting the amount of ammonia or amine required for the amidation. If so desired, the dichlorophosphate need not be recovered from the phosphorylation mixture prior to hydrolysis, but water in the necessary amount may be added to the phosphorylation mixture, and thereafter be followed by the necessary amount of ammonia or amine.

The amine employed in the amidation reaction may be a primary or secondary alkylamine, aromatic amine, or heterocyclic amine. When ammonia is used, it may be employed as a gas or as a liquid. The ammonia or amine is preferably employed in excess over the monochlorophosphate present even if there is no free acid to be neutralized.

The amidation reaction takes place at room temperature within a period of 10 minutes to several hours. Because of the sensitivity of the starting materials to elevated temperature, external cooling should be employed if the ammonia or amine is used also for neutralizing acid formed by hydrolysis.

The preferred solvent medium consists essentially of tertiary esters of phosphoric acid with alkanols having one to four carbon atoms or their halogenated derivatives. Trimethyl phosphate, triethyl phosphate, n-tripropyl phosphae, tri-n-butyl phosphate and tri($\beta$-chloroethyl) phosphate are readily or relatively easily available, and are conveniently used. The ammonium or amine salts of the 5′-phosphoramidates of nucleosides and 2′,3′-O-protected nucleosides, which are formed by the reaction of the invention, are soluble in the solvent medium and are precipitated therefrom by the addition of non-solvents miscible with the medium, such as ethyl ether, petroleum ether, benzene, or halogenated hydrocarbons.

If the phosphorylation mixture containing the nucleoside-5′-dichlorophosphate together with excess phosphorylation agent is carefully hydrolyzed to form the monochlorophosphate, and there after treated with ammonia or an amine to produce the 5′-phosphoramidate in a single procedure, there is obtained a crude mixture contaminated by phosphoric acid derivatives or salts of the ammonia or amine, and this crude product may be used without further purification for the synthesis of a nucleoside-5′-diphosphate or -triphosphate. The overall yield of phosphoramide based on the nucleoside employed as starting material is about 80% in this procedure.

The following examples are further illustrative of this invention.

EXAMPLE 1

A suspension of 0.87 g. inosine in 7.5 ml. triethyl phosphate was stirred while 0.6 ml. phosphorus oxychloride and 0.04 ml. water were added. Thereafter several hours, enough dry ethyl ether was added to complete precipitation of the inosine-5′-dichlorophosphate formed. The precipitate was recovered by centrifuging and dissolved in 7.5 ml. triethylphosphate. The solution was kept at 0° C. while a mixture of 52 mg. water and 2.5 ml. triethyl phosphate was added, and for three hours thereafter. It was then mixed with 4 ml. morpholine and held at room temperature for 30 minutes.

Ether was added until no further precipitate was formed. The precipitate weighed 2.2 g. and contained 62% of the morpholine salt of inosine-5′-phosphoromorpholidate as determined by paper chromatography. The yield was 93% based on the inosine-5′-dichlorophosphate.

In an analogous manner, 2.1 g. crude morpholine salt of uridine-5′-phosphoromorpholidate was obtained from 0.79 g. uridine and had a purity of 62%. The yield was 82% based on the intermediate uridine-5′-dichlorophosphate.

Similarly, 0.84 g. 5-amino-4-imidazolecarboxamide riboside was converted to 2.1 g. of the crude morpholine salt of 5-amino-4-imidazolecarboxamide riboside-5′-phosphoromorpholidate (67% purity, 85% yield).

EXAMPLE 2

0.54 ml. phosphorus oxychloride was added to a suspension of 0.62 g. 2′,3′-O-isopropylidene adenosine in 7 ml. trimethyl phosphate, and the mixture was stirred at −5° C. for three hours. Dry ether was then added until the crude 2′,3′-O-isopropylidene adenosine-5′-dichlorophosphate was precipitated. The solid material was recovered by centrifuging and dissolved in 7 ml. trimethyl phosphate, and a mixture of 33 mg. water and 2.5 ml. trimethyl phosphate was added to the solution at 0° C.

After standing at the same temperature for 3 hours, the resulting mixture was further mixed with 4 ml. morpholine and kept at room temperature for 30 minutes. The crude morpholine salt of 2′,3′-O-isopropylidene-adenosine-5′-phosphoromorpholidate was then precipitated with anhydrous ether and recovered. It weighed 1.4 g. and had a purity of 60% as determined by paper chromatography. The yield was 88% based on the 2′,3′-O-isopropylidene adenosine-5′-di-chlorophosphate.

The same method, when applied to 0.65 g. 2′,3′-O-isopropylidene guanosine, gave 1.4 g. crude morpholine salt of 2′,3′ - O-isopropylideneguanosine-5′-phosphoromorpholidate having a purity of 60% (88% yield).

EXAMPLE 3

0.62 g. 2′,3′-O-isopropylidene adenosine was phosphorylated and partially hydrolyzed as described in Example 2. An excess of dry, gaseous ammonia was then led into the reaction mixture, and the crude ammonium salt of 2′,3′-O-isopropylidene adenosine-5′ - phosphoramidate was precipitated with ether. It weighed 0.95 g. and had a purity of 64% as determined by paper chromatography for a yield of 81% based on the 2′,3′-O-isopropylidene adenosine-5′-dichlorophosphate.

EXAMPLE 4

0.62 g. 2′,3′-O-isopropylidene inosine was added with stirring to a mixture of 6 ml. phosphorus oxychloride and 0.036 ml. water. When the phosphorylation reaction was completed, dry ether was added to the reaction mixture to precipitate crude 2′,3′-O-isopropylidene inosine-5′-dichlorophosphate, which was recovered by centrifuging and then partly hydrolyzed and reacted with morpholine as described in Example 1. The resulting crude morpholine salt of 2′,3′ - O-isopropylidene-inosine-5′-phosphoromorpholidate weighed 1.4 g. and had a purity of 63% as determined by paper chromatography for a yield of 91% based on the 2′,3′-O-isopropylideneinosine-5′-dichlorophosphate.

EXAMPLE 5

Using the procedure of Example 1, 0.87 g. adenosine was phosphorylated, partly hydrolyzed, and then reacted with an amine to prepare the corresponding amine salt of an adenosine-5′-phosphoramidate.

The weight of the crude salt and the yield, based on the adenosine-5′-dichlorophosphate, are listed below.

| Amine | Amine salt of adenosine-5′-phosphoramidate | |
|---|---|---|
| | Weight, grams | Yield, percent |
| Morpholine | 2.1 | 89 |
| Cyclohexylamine | 1.8 | 79 |
| n-propylamine | 1.5 | 72 |
| n-amylamine | 1.15 | 54 |
| Piperidine | 1.8 | 75 |

Trimethyl phosphate and triethyl phosphate are most conveniently available, and are preferred as solvent media in the method of our invention. Other tri alkyl phosphates and the corresponding tri-haloalkyl phosphates may also be employed without otherwise altering the reaction conditions. The alcohol moieties of the tertiary phosphoric acid esters employed as a solvent medium in the method of the invention appear to be without influence on the yield or on other operating variables. The several tripropyl and tributyl phosphates have been found to be fully effective, and equally satisfactory results have been obtained with tri-β-chloroethyl phosphate.

Nucleosides whose oxygen atoms in positions 2′ and 3′ are protected otherwise than by an isopropylidene group undergo conversion to the amine salts of the corresponding 5′-phossphoroamidate in an analogous manner. The procedure outlined in Examples 2–4 can be applied without change and produces corresponding results when the 2′,3′-O-isopropylidene group of the nucleosides is replaced by two acetyl groups or other groups conventionally employed in this art to protect the oxygen atoms in positions 2′ and 3′.

The amines referred to above are merely representative of the virtually unlimited number of primary and secondary amines capable of reacting with the chlorine atoms of the nucleoside-5′-monochlorophosphates of the invention. We are not aware of an amine otherwise stable under the conditions of this reaction and not capable of forming the desired phosphoramidate. Tertiary amines, of course, cannot be reacted.

What is claimed is:
1. A method of preparing a 5′-phosphoramidate of a compound selected from the group consisting of nucleosides and 2′,3′-O-protected nucleosides which comprises reacting the 5′-monochlorophosphate of said compound with ammonia or with a primary or secondary amine having up to six carbon atoms in a solvent medium essentially consisting of a liquid tri-lower-alkyl phosphate or tri-lower-haloalkyl phosphate, until the salt of said 5′-phosphoramidate with said ammonia or with said amine is formed.

2. A method as set forth in claim 1, wherein said compound is a 2′,3′-O-isopropylidenenucleoside.

3. A method as set forth in claim 1, wherein said solvent medium essentially consists of a tri-lower-alkyl phosphate.

4. A method as set forth in claim 1, wherein said solvent essentially consists of tri-β-chloroethyl phosphate.

5. A method as set forth in claim 1, wherein said 5'-monochlorophosphate is reacted with a primary or secondary amine.

6. A method as set forth in claim 1, wherein said formed salt is recovered from said meduim.

References Cited

UNITED STATES PATENTS

| | | | |
|---|---|---|---|
| 3,079,379 | 2/1963 | Tanaka et al. | 260—211.5 |
| 3,280,104 | 10/1966 | Moffatt et al. | 260—211.5 |
| 3,413,282 | 11/1968 | Yoshikawa et al. | 260—211.5 |
| 3,438,968 | 4/1969 | Glasky | 260—211.5 |
| 3,256,249 | 6/1966 | Vogt et al. | 260—234 |

OTHER REFERENCES

Chambers et al.: "Jour. Amer. Chem. Soc.," vol. 80, 1958, pp. 3749–3751.

LEWIS GOTTS, Primary Examiner

J. R. BROWN, Assistant Examiner